US010937327B2

(12) United States Patent
Cohen

(10) Patent No.: US 10,937,327 B2
(45) Date of Patent: Mar. 2, 2021

(54) METHOD AND SYSTEM FOR AUTONOMOUS DYNAMIC AIR TRAFFIC MANAGEMENT

(71) Applicant: CICONIA LTD., Nes-Ziona (IL)

(72) Inventor: Moshe Cohen, Ness Ziona (IL)

(73) Assignee: CICONIA LTD., Nes-Ziona (IL)

( * ) Notice: Subject to any disclaimer, the term of this patent is extended or adjusted under 35 U.S.C. 154(b) by 328 days.

(21) Appl. No.: 15/745,467

(22) PCT Filed: Jul. 20, 2016

(86) PCT No.: PCT/IL2016/050788
§ 371 (c)(1),
(2) Date: Jan. 17, 2018

(87) PCT Pub. No.: WO2017/013650
PCT Pub. Date: Jan. 26, 2017

(65) Prior Publication Data
US 2018/0211549 A1 Jul. 26, 2018

(30) Foreign Application Priority Data

Jul. 21, 2015 (IL) .......................................... 240073

(51) Int. Cl.
*G08G 5/04* (2006.01)
*G08G 5/00* (2006.01)
*G05D 1/10* (2006.01)

(52) U.S. Cl.
CPC ............. *G08G 5/045* (2013.01); *G05D 1/104* (2013.01); *G08G 5/0008* (2013.01);
(Continued)

(58) Field of Classification Search
CPC ............ G08G 5/04; G08G 5/045; G08G 5/00; G08G 5/0004; G08G 5/0008;
(Continued)

(56) References Cited

U.S. PATENT DOCUMENTS 4,063,073 A 12/1977 Strayer et al.
5,058,024 A 10/1991 Inselberg
(Continued)

OTHER PUBLICATIONS

Extended European Search Report for EP Application No. 16827363.9 dated Mar. 11, 2019.
(Continued)

*Primary Examiner* — Thomas G Black
*Assistant Examiner* — Sara J Lewandroski
(74) *Attorney, Agent, or Firm* — Pearl Cohen Zedek Latzer Baratz LLP

(57) ABSTRACT

A system and method for autonomous dynamic air traffic management. The method includes sensing a current location of a flying platform using at least one of a plurality of positioning sensors onboard the flying platform, transmitting location transmissions and receiving location transmissions from other flying platforms, determining from the received location transmissions and the sensed current location whether the flying platform and another flying platform are flying in a mutually intentional flight pattern or in a mutually unintentional flight pattern, based on one or more indications; refraining from alerting when the flying platform and the other flying platform fly close to each other within a predetermined range when flying in a mutually intentional flight pattern; detecting a risk of collision between the flying platform and said another of said one or a plurality of flying platforms; and generating an evading action instruction for the flying platform to avoid the collision.

18 Claims, 7 Drawing Sheets

(52) U.S. Cl.
CPC ......... *G08G 5/0021* (2013.01); *G08G 5/0069* (2013.01); *G08G 5/0078* (2013.01)

(58) Field of Classification Search
CPC .. G08G 5/0017; G08G 5/0021; G08G 5/0039; G08G 5/0047; G08G 5/006; G08G 5/0069; G08G 5/0073; G08G 5/0078; G08G 5/0095; G08G 1/20; G08G 1/205; G08G 1/207; G08G 1/22; G05D 1/104
See application file for complete search history.

(56) References Cited

U.S. PATENT DOCUMENTS

| | | | |
|---|---|---|---|
| 5,714,948 | A | 2/1998 | Farmakis et al. |
| 5,872,526 | A | 2/1999 | Tognazzini |
| 6,314,366 | B1 * | 11/2001 | Farmakis .............. G01S 5/0009 701/482 |
| 6,483,454 | B1 | 11/2002 | Torre et al. |
| 6,531,978 | B2 * | 3/2003 | Tran ...................... G08G 5/045 342/29 |
| 6,657,578 | B2 * | 12/2003 | Stayton ................ G08G 5/0008 342/29 |
| 6,992,597 | B2 | 1/2006 | Rogers et al. |
| 7,548,183 | B2 | 6/2009 | King et al. |
| 7,957,853 | B2 | 6/2011 | Stock et al. |
| 8,380,367 | B2 * | 2/2013 | Schultz ................ G01S 13/865 701/3 |
| 8,380,425 | B2 | 2/2013 | Duggan et al. |
| 8,700,306 | B2 | 4/2014 | Duggan et al. |
| 8,892,348 | B2 | 11/2014 | Chamlou |
| 9,104,201 | B1 * | 8/2015 | Pillai ..................... G08G 5/0082 |
| 2002/0011950 | A1 | 1/2002 | Frazier et al. |
| 2002/0080059 | A1 * | 6/2002 | Tran ....................... G08G 5/045 342/29 |
| 2003/0016159 | A1 * | 1/2003 | Stayton ................ G08G 5/0052 342/30 |
| 2005/0219113 | A1 | 10/2005 | Rowlan |
| 2007/0222665 | A1 | 9/2007 | Koeneman |
| 2009/0088972 | A1 * | 4/2009 | Bushnell ............... G08G 5/045 701/414 |
| 2012/0253555 | A1 * | 10/2012 | Stange ................. G05D 1/0055 701/3 |
| 2014/0249693 | A1 * | 9/2014 | Stark ..................... B64D 47/02 701/2 |
| 2016/0189549 | A1 * | 6/2016 | Marcus ................ G08G 5/0039 701/3 |
| 2016/0363938 | A1 * | 12/2016 | Frolov .................. B64C 39/024 |
| 2016/0364989 | A1 * | 12/2016 | Speasl .................. B64C 39/024 |
| 2017/0178516 | A1 * | 6/2017 | Shenfeld ............... G08G 5/045 |
| 2018/0231972 | A1 * | 8/2018 | Woon ................... G05D 1/0808 |
| 2018/0233054 | A1 * | 8/2018 | Woon ................... G08G 5/0069 |
| 2018/0268719 | A1 * | 9/2018 | Guan .................... G08G 5/0056 |

OTHER PUBLICATIONS

International Search Report of PCT Application No. PCT/IL2016/050788 dated Nov. 3, 2016.

Ennis et al, "A formal approach to the analysis of aircraft protected zone", Air Traffic Control Quarterly, vol. 12, No. 1, 2004, pp. 1-29.

Chamlou, "Future airborne collision avoidance—Design principles, analysis plan and algorithm development", Center for Adv. Aviation Syst. Dev., MITRE Corp., McLean, VA, USA, Oct. 2009. (abstract only), pp. 1-3.

Kim et al, "A Probabilistic Algorithm for Multi-aircraft Collision Detection and Resolution in 3-D", KSAS International Journal, Nov. 2008, vol. 9, No. 2, pp. 1-8.

Zhao, "A systematic procedure for determining separation minima", 26th International Congress of the Aeronautical Sciences, 2008, pp. 1-10.

\* cited by examiner

METHOD AND SYSTEM FOR AUTONOMOUS DYNAMIC AIR TRAFFIC MANAGEMENT

CROSS-REFERENCE TO RELATED APPLICATIONS

This application is a National Phase Application of PCT International Application No. PCT/IL2016/050788, International Filing Date Jul. 20, 2016, claiming priority of Israeli Patent Application No. 240073, filed Jul. 21, 2015, which are hereby incorporated by reference.

FIELD OF THE INVENTION

The present invention relates to mid-air collision avoidance and air traffic control. More specifically, the present invention relates to a method and system for autonomous dynamic air-traffic management.

BACKGROUND OF THE INVENTION

Mid-air collisions between aircrafts in flight are often fatal, resulting in loss of lives (typically of those onboard the aircrafts, but sometimes also resulting in loss of lives and casualties among people on the ground). Apart from loss of lives, mid-air collisions also impart heavy financial losses ranging from ruined aircrafts, lost payload and damages inflicted to buildings and other valuables on the ground.

Various systems and methods were developed to avoid mid-air collision or to substantially reduce the chances for such collision.

For example, U.S. Pat. No. 5,714,948 (Farmakis et al.) discloses a satellite based air traffic control (ATC) system that includes an aircraft unit on an aircraft and an ATC facility. The aircraft unit includes an ATC Aircraft Reporting and Tracking System (AARTS) processor, Global Positioning System (GPS) receivers or other satellite receivers, a comparator for comparing the GPS data, a two-way radio, and a transmitter and receiver for communicating information and data over a data link with the ATC facility. The system uses GPS on board the aircraft to enhance ATC data and improve the determination of aircraft locations. U.S. Pat. No. 5,872,526 (Tognazzini) also discloses a GPS collision avoidance system utilizing GPS for exact location of aircrafts.

U.S. Pat. No. 4,063,073 (Strayer) disclosed a method for preventing collision between moving objects such as aircraft moving from one sector to another. This patent refers, inter-alia, to a well-known method of considering cylinders as representations of the airborne aircraft in order to enhance the presence of a safety envelope around the aircraft (and see also U.S. Pat. No. 5,058,024).

U.S. Pat. No. 8,380,425 (Duggan et al., and see also U.S. Pat. No. 8,700,306) disclosed an autonomous collision avoidance systems for unmanned aerial vehicles. Systems illustratively include a detect and track module, an inertial navigation system, and an auto avoidance module. The detect and track module senses a potential object of collision and generates a moving object track for the potential object of collision. The inertial navigation system provides information indicative of a position and a speed of the unmanned aerial vehicle. The auto avoidance module receives the moving object track for the potential object of collision and the information indicative of the position and the speed of the unmanned aerial vehicle. The auto avoidance module utilizes the information to generate a guidance maneuver that facilitates the unmanned aerial vehicle avoiding the potential object of collision.

U.S. Pat. No. 8,892,348 (Chamlou) disclosed methods, systems, and computer program products for aircraft conflict detection and resolution. Embodiments of the invention detect potential conflicts without a predetermined look-ahead time threshold and determine the time for issuing resolution alerts dynamically based on the relative movements of the aircraft. A method embodiment for detecting a potential airborne conflict between an ownship and at least one intruder includes, determining a relative motion trajectory of the ownship and the intruder, generating a plurality of resolution advisories based upon the determined relative motion trajectory and corresponding to respective motion dimensions of the ownship, determining an alert time for each of the plurality of RAs responsive to the corresponding motion dimension and the determined relative motion trajectory, and transmitting at least one of the plurality of RAs to at least one of the ownship or an aircraft control entity.

SUMMARY OF THE INVENTION

There is provided, according to some embodiments of the present invention, an autonomous dynamic air traffic management (ADATM) transceiver unit for mounting onboard a flying platform. The unit may include at least one of a plurality of positioning sensors to sense a current location of the flying platform. The unit may also include at least one of a plurality of transceivers to transmit location transmissions and to receive location transmissions from one or a plurality of other ADATM transceiver units each mounted onboard one or a plurality of other flying platforms, the location transmission including current location and unique identifier of the flying platform that has transmitted that location transmission. The unit may further include a processor to: determine from the received location transmissions and the sensed current location whether the flying platform and another of said one or a plurality of flying platforms are flying in a mutually intentional flight pattern or in an mutually unintentional flight pattern, based on one or more indications from the received location transmissions and the sensed current location; to refrain from alerting when the flying platform and said another of said one or a plurality of flying platforms fly close to each other within a predetermined range when their flight pattern is determined to be mutually intentional; to detect a risk of collision between the flying platform and said another of said one or a plurality of flying platforms; and to generate an evading action instruction for the flying platform to avoid the collision.

In some embodiments the processor is configured, based on the determined flying pattern, to consider a dynamic safety cylinder around each of the flying platform and said another of said one or a plurality of flying platforms, decreasing the dimensions of the dynamic safety cylinders when the flight pattern is determined to be mutually intentional, and increasing the dimensions of the dynamic safety cylinders when the flight pattern is determined to be mutually unintentional.

In some embodiments the processor is configured to detect the risk of collision based on calculating a risk of collision between the dynamic safety cylinders of the flying platform and said another of said one or a plurality of flying platforms.

In some embodiments the positioning sensor is selected from the group of sensors consisting of GPS, GLONASS, Galileo, BeiDou, QZSS, IRNSS, and inertial sensor.

The unit may also include a communication module to get updates from a remote server and to communicate recorded data to the remote server.

The unit may also include an output device to output the evasion action instruction for presenting the evading action instruction to a pilot of the flying platform.

The output device may be selected from the group of devices consisting of audio device and video device.

In some embodiments the processor is configured to cause overriding of flight controls of the flying platform and to cause the flying platform to perform the evading action.

According to some embodiments of the invention the mutually intentional flight pattern may be selected from the group of flight patterns consisting of flight formation, crossover, fly-by, and orthogonal flight.

According to some embodiments of the invention, the mutually intentional flight pattern is formation flight, and the processor is configured to determine the formation flight when a distance between the flying platform and said another of said one or a plurality of flying platforms is not greater than a predetermined distance, and wherein at least one of the flying platform and said another of said one or a plurality of flying platforms has positive PVC with respect to the other of said flying platform and said another of said one or a plurality of flying platforms, over a predetermined period of time.

According to some embodiments of the invention, the mutually intentional flight pattern is cross over, and the processor is configured to determine the cross over, when a parallel component of a distance between the flying platform and said another of said one or a plurality of flying platforms remains substantially unchanged while a perpendicular component of the distance is changing.

In some embodiments the transceiver is configured to transmit the location transmission is transmitted continuously or intermittently.

In some embodiments the processor is further configured to detect a flight mode relating to the flying platform and one of the other flying platforms, and wherein the evading action instruction is based on the detected flight mode. The flight mode may be selected from the group of modes consisting of: head-on mode, orthogonal-mode, hover-mode, general mode, and multiple platform mode.

In some embodiments the processor is configured to generate the evading action instruction based on one or more of the following rules: the platform which is higher is instructed to ascend and the other platform to descend, in an undefined situation a master-slave approach is used, where one of the platforms is designated as a master, and another of said one of more platforms is designated as a slave, and wherein the slave platform is configured to react to a maneuver performed by the master platform.

In some embodiments the unit may be further configured to perform density control within a dynamically ad-hock determined restricted fly-zone.

In some embodiments the predetermined range is 500 to 30 meters.

There is also provided, according to some embodiments of the invention, a system for autonomous dynamic air traffic management (ADATM). The system may include an autonomous dynamic air traffic management (ADATM) transceiver unit for mounting onboard a flying platform. The unit may include at least one of a plurality of positioning sensors to sense a current location of a flying platform; at least one of a plurality of transceivers to transmit location transmissions and to receive location transmissions from one or a plurality of other ADATM transceiver units each mounted onboard one or a plurality of other flying platforms, the location transmission including current location and unique identity of the flying platform that has transmitted that location transmission; and a processor to: determine from the received location transmissions and the sensed current location whether the flying platform and another of said one or a plurality of flying platforms are flying in a mutually intentional flight pattern or in an mutually unintentional flight pattern, based on one or more indications from the received location transmissions and the sensed current location; refrain from alerting when the flying platform and said another of said one or a plurality of flying platforms fly close to each other within a predetermined range when their flight pattern is determined to be mutually intentional; detect a risk of collision between the flying platform and said another of said one or a plurality of flying platforms; and generate an evading action instruction for the flying platform to avoid the collision.

According to some embodiments of the invention, there is provided a method for autonomous dynamic air traffic management (ADATM). The method may include sensing a current location of a flying platform using at least one of a plurality of positioning sensors onboard said flying platform; transmitting location transmissions and receiving location transmissions from one or a plurality of other flying platforms, the location transmission including current location and unique identity of the flying platform that has transmitted that location transmission; determining from the received location transmissions and the sensed current location whether the flying platform and another of said one or a plurality of flying platforms are flying in a mutually intentional flight pattern or in an mutually unintentional flight pattern, based on one or more indications from the received location transmissions and the sensed current location; refraining from alerting when the flying platform and said another of said one or a plurality of flying platforms fly close to each other within a predetermined range when their flight pattern is determined to be mutually intentional; detecting a risk of collision between the flying platform and said another of said one or a plurality of flying platforms; and generating an evading action instruction for the flying platform to avoid the collision.

BRIEF DESCRIPTION OF THE DRAWINGS

In order to better understand the present invention and appreciate its practical applications, the following figures are provided and referenced hereafter. It should be noted that the figures are given as examples only and in no way limit the scope of the invention. Like components are denoted by like reference numerals.

DETAILED DESCRIPTION OF THE INVENTION

Figure 1:
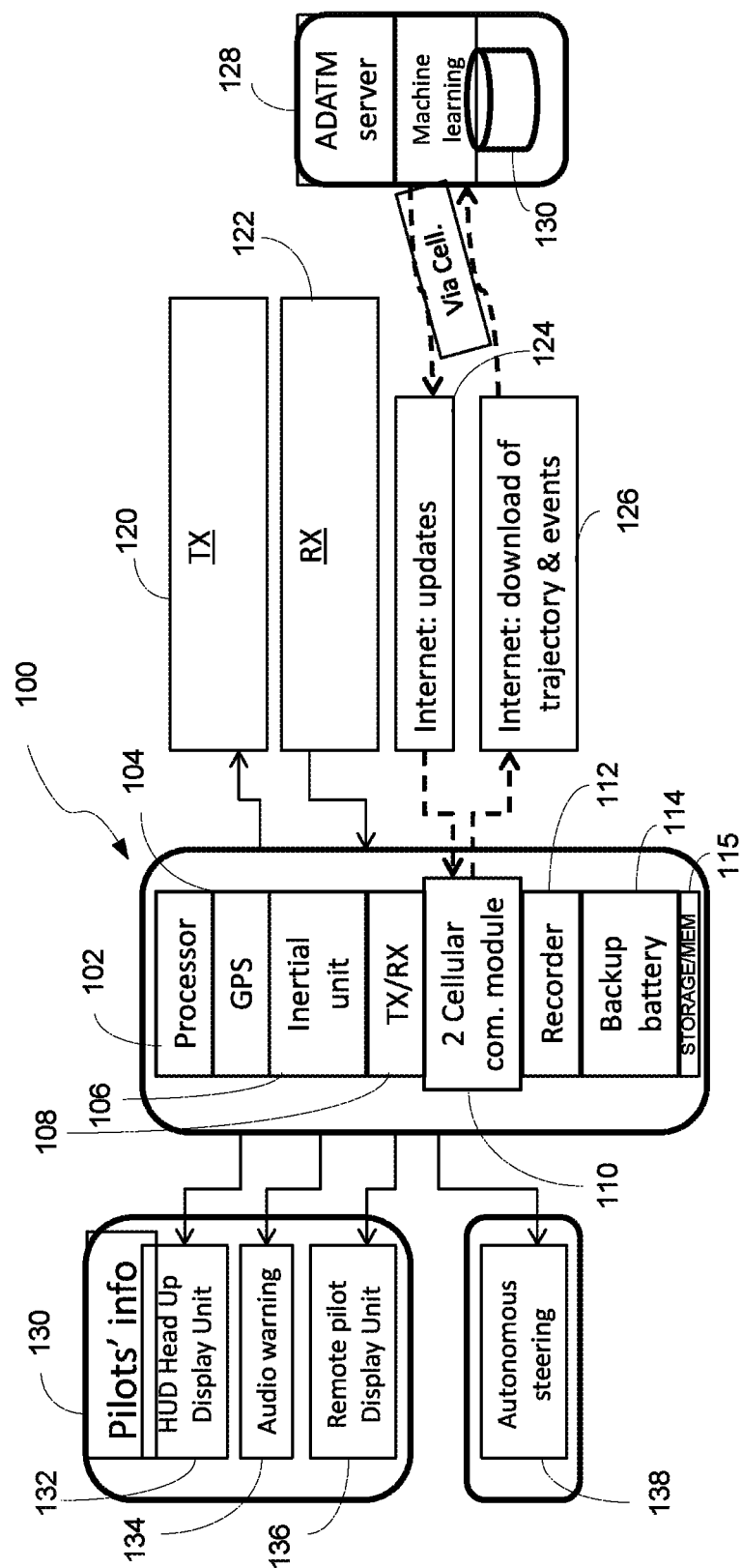
FIG. 1 schematically illustrates an on-board autonomous dynamic air-traffic management (ADATM) transceiver unit, according to some embodiments of the present invention.

In the following detailed description, numerous specific details are set forth in order to provide a thorough understanding of the methods and systems. However, it will be understood by those skilled in the art that the present methods and systems may be practiced without these specific details. In other instances, well-known methods, procedures, and components have not been described in detail so as not to obscure the present methods and systems.

Although the examples disclosed and discussed herein are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method examples described herein are not constrained to a particular order or sequence. Additionally, some of the described method examples or elements thereof can occur or be performed at the same point in time.

Unless specifically stated otherwise, as apparent from the following discussions, it is appreciated that throughout the specification, discussions utilizing terms such as "adding", "associating" "selecting," "evaluating," "processing," "computing," "calculating," "determining," "designating," "allocating" or the like, refer to the actions and/or processes of a computer, computer processor or computing system, or similar electronic computing device, that manipulate, execute and/or transform data represented as physical, such as electronic, quantities within the computing system's registers and/or memories into other data similarly represented as physical quantities within the computing system's memories, registers or other such information storage, transmission or display devices.

The world's deadliest mid-air collision happened in 1996 when Saudia flight 763 and Air Kazakhstan flight 1907 collided over the village of Charkhi Dadri in India, killing all 349 passengers and crew on board both aircraft. Other mid-air collisions over the years took the lives of many passengers and crew members. A mid-air collision is an aviation accident involving two or more aircraft that come into contact during flight. In the context of the present invention the definition of "mid-air collision" is extended to also include an accident in which an aircraft (one or more) collides with a toll building or other man-made structure or natural earth structure (for example: cliffs, ground). While a mid-air collision may occur during takeoff, ascending at cruise altitude or when descending towards landing, the risk of mid-air collision is evidently greater near air-fields or in narrow air-corridors in which aircraft traffic is relatively high. The advance in unmanned aircraft (unmanned aerial vehicles—UAV) has brought about increased risk of collisions between two UAVs of between a manned aircraft and UAV.

Typically, when cruising, aircraft fly far from each other. Typically, the distance between cruising aircraft that fly by is usually more than one kilometer, and in many cases much more.

Some embodiments of the present invention relate to a scenario in which aircraft fly closely. In some embodiments of the invention the allowed distance between two or more aircraft ranges up to 1 kilometer. In some embodiments of the invention, the allowed distance between two or more aircraft ranges up to 500 meters. In some embodiments of the present invention two aircraft are allowed to fly as close as 30 meters one form another. In many typical scenarios helicopters, transportation and observation airplanes and other slow flying platforms operate together in small, restricted areas. In some other specific scenarios several flying platforms fly in formation requiring the flying platforms to fly close to each other.

Often pilots have restricted or obstructed view of the outside, and this unavoidably leads to blind areas around the platform which the pilot is unable to see.

There are many types and kinds of aircraft that may be found in the air, for example: manned aircraft, unmanned aircraft, fixed wing aircraft, rotatable wing (e.g., helicopters), small and large aircraft, piloted, remote-piloted and autonomous flying platforms. There aircraft carry out many tasks and missions, such as, for example, transporting people and transportable objects, airline services, private airplanes, medical evacuations, police patrols, traffic reporters, fire fighters, monitoring and observation, mapping, ground traffic control and others.

In areas designated by regulators, when current weather allows for clear conditions the pilots are bound by Visual Flight Rules, which are a set of regulations which the pilots must observe in such conditions. Flying by VFR may be controlled (controlled VFR) or Uncontrolled (Uncontrolled VFR). VFR requires that a pilot be able to see outside the cockpit, to control the altitude of the aircraft and avoid obstacles and other aircraft. Instrument Flying Rules are a set of rules governing flights when visibility is below the minimum allowing for VFR or when otherwise required by rules. While en route to a distant airport large aircraft, such as, for example, airliners and other large airplanes fly under Air Traffic Control (ATC) assigning these aircraft routes and altitudes.

There are several risk factors that may increase the risk for mid-air collisions, some of which include:

A. Unmanned aircraft are remotely piloted thereby visibility near the aircraft is irrelevant, as the operator of such aircraft cannot freely see the view about the aircraft;

B. Pilots of manned aircraft may have difficulties detecting unmanned aircraft (e.g., remote controlled drones) which are typically much smaller than manned aircraft;

C. The numbers of aircraft flying within a given air space are rapidly and steadily increasing, causing greater aerial congestion problems.

D. Pilots fatigue/human error may cause pilots to lose visual contact with another aircraft or with an obstacle, or to misjudge the rate of closure between flying platforms or between a flying platform and an obstacle or a fly into a no fly zone.

A mid-air collision avoidance method and system facilitating safe flight of near-by aircraft are introduced herein, according to some embodiments of the present invention. The mid-air collision avoidance method and system, according to some embodiments of the invention is subjected to an autonomous dynamic air-traffic management (ADATM), which is explained hereinafter.

A main aspect, according to some embodiments of the invention, relates to an automated dynamic air traffic management method and system for aircraft flying closely.

When aircraft fly closely, e.g., two helicopters in formation flight pattern, or other mutually intentional flight pattern (to be explained hereinafter) the distance between the two aircraft is very short. If, for any reason the pilots lose eye contact it is vital to get the two aircraft to perform evading action to avoid collision. At that point, the evading action taken by each pilot has to be precise and effective. Thus, another aspect of the present invention is the provision of an automated dynamic air traffic management method and system that would distinguish mutually intentional flight pattern from unintentional one, allowing the two platforms to fly close by, when their flight pattern is determined to be mutually intentional, and generate evading action to avoid collision when a risk of collision is detected.

Another main aspect, according to some embodiments of the present invention, relates to an on-board ADATM transceiver unit located on a flying platform, which is designed to communicate with ADATM transceiver units of other platforms. In its most basic form, the ADATM transceiver unit is designed to transmit a sequence of communications that include, each, information on the identity of the platform on which it is located, and its current location. For brevity, the sequence of communications is hereinafter referred to as "location transmission". In some embodiments of the invention, the location transmission may further additional information (e.g. emergency indication, alert level indication, speed vector, heading, speed, altitude, etc., evading maneuver information on an evading maneuver the platform is about to take, etc.), The communications of the sequence of communications are transmitted continuously or intermittently. In some embodiments of the present invention the heading and speed of that platform is determined from these communications. Each ADATM transceiver unit may determine from its own GPS sensor and received location transmissions from other ADATM transceiver units of other platforms, its own location, heading and speed, as well as the locations, headings and velocities of other platforms in a near-by flight zone. In essence, each ADATM transceiver unit is designed to process the identity and location information retrieved from the received location transmission, and determine its own and other platforms' flight patterns (e.g., anticipated trajectories) and whether its own platform is in a collision course with any of the platforms in the vicinity. Upon determination of a potential collision an alert and an evading action instruction are issued by the ADATM transceiver unit, which are presented to the pilot. In some embodiments of the present invention the evading action instruction overrides the flight controls of the platform and forces it to perform the evading action.

For brevity, any aircraft or other object (airborne or on the ground) that participates in an ADATM system by having an on-board ADATM transceiver unit, is hereinafter referred to as a "flying platform" or just a "platform".

According to some embodiments of the present invention, the ADATM transceiver unit is configured to distinguish between mutually intentional flight pattern and mutually unintentional flight pattern so as to allow close-by mutually intentional flight pattern of two aircraft (one of which is the aircraft on which that ADATM transceiver unit, and the other aircraft having another ADATM transceiver unit onboard, hereinafter—the two platforms), while refraining from issuing alerts as long as the flight of these aircraft is determined to be intentional, for a given flight scenario.

"Mutually intentional flight pattern", in the context of the present invention, refers to a flight pattern which is deliberately and intentionally performed by the pilots of the two platforms, or at least both pilots are aware of it as it is performed. If one of the pilots, or both, is unaware of the current flight pattern being performed, it is considered as "mutually unintentional flight pattern". "Pilot" in the context of the present invention refers to a human, machine, a pilot onboard the platform, a remote pilot or an autopilot. "Flight scenario" refers to a flight situation in which the two platforms are involved.

The ADATM transceiver unit is designed not to interfere with flight patterns normally executed by pilots, remote pilots or autopilots. However, when the ADATM transceiver unit detects predetermined indication (or indications) of uncontrolled flight, hereinafter referred toas "unintentional flight pattern", which may pose a risk to the own platform, the ADATM transceiver unit is configured to issue an emergency alert and generate steering commands to evade the risk of collision. Each platform has its own ADATM transceiver unit, which independently analyzes the flight scenario and reacts in accordance with predetermined set of rules.

According to some embodiments of the present invention an algorithm used by ADATM is based upon a set of rules and parameters whose values are predetermined and or expected to be in a predetermined range. The set of parameters may include: rate of closure (e.g., how fast they are closing in), speed, rate of climb (or descend), delay time, distance, radius and height of safety cylinders, (type of platform (manned/unmanned), geometry, type of flight (e.g., formation or solo, cross over, cross under, head on, tail on, hover, ground taxi, near ground taxi, etc.), dimensions of the dynamic safety cylinder around each platform and the set of parameters to dynamically control these dimension, An ADATM environment may include active and passive platforms. An "active platform" in the context of the present invention, relates to a platform whose ADATM transceiver unit may transmit its own location transmissions, as well as receive location transmissions from other ADATM transceiver units. A "passive platform" in the context of the present invention, relates to a platform whose ADATM transceiver unit does not transmit its own location transmissions, but receives location transmissions from other ADATM transceiver units. In some embodiments of the invention, a passive platform transmit location transmissions only when determining a collision risk.

FIG. 1 schematically illustrates an on-board ADATM transceiver unit, according to some embodiments of the present invention. Each flying platform, which is to be managed by an ADATM system, according to some embodiments of the invention, includes an on-board ADATM transceiver unit 100. ADATM transceiver unit 100 includes processor 102, for executing an ATADM program and for processing related data. ADATM transceiver unit 100 may also include at least one kinematics sensor. "Kinematics" generally refers to location, heading and speed. According to some embodiments of the present invention, the kinematics sensor is used to determine a current location of the flying platform. In some embodiments it is used to determine location, heading and speed (vertical & horizontal), or part thereof. In some embodiments it is used to determine the change of heading and speed, or part thereof. To increase reliability it is useful to include a plurality of kinematics sensor units in the ADATM transceiver unit, operating independently, employing different, independent types of operation, so that if one kinematics sensor unit fails, at least one other kinematics sensor unit can back it up. For example, ADATM transceiver unit 100 may include a Global Positioning System (GPS) sensor as a kinematics sensor unit for determining the current location of the flying platform, its heading and speed. ADATM transceiver unit 100 may also include an inertial sensor unit 106 for determining the current location of the flying platform, its heading and speed, as a complementary independent kinematics sensor unit. In some embodiments of the present invention, two or more positioning sensors may be used, each relating to a different satellite-based positioning system. For example, the positioning sensors may relate to two or more satellite-based positioning systems selected from, for example, GPS, GLONASS, Galileo, BeiDou, QZSS, and IRNSS.

ADATM transceiver unit 100 also includes a transceiver for transmitting and for receiving location transmissions to and from other on-board ADATM transceiver units located on other platforms. In some embodiments of the invention the communication module 110 of the ADATM transceiver unit is provided, configured to communicate with an ADATM remote server 128. Server 128 may be the source for providing to the ADATM transceiver unit updates of the operating system, updates for an application executed on the ADATM transceiver unit and for updates of rules, regulations, weather updates, temporal flight constraints, obstacle information, etc. (hereinafter—updates). Temporal constraints may include, for example, a management directive that in a given zone a maximal number of platforms may be allowed to fly, flight privileges, prioritized privileges etc. Prioritized privileges may include, for example, assigning a priority level to platforms, depending on their missions. Thus, for example, a medical evacuation helicopter would have a higher priority level over a traffic report helicopter. Different missions may be assigned different priority levels according to predefined preferences. The updates may be communicated to the ADATM transceiver unit at given time or times, for example, before the beginning of a flight.

In some embodiments, the server updates regarding all flight notices and changes in regulations may be governed by regulators, in their corresponding jurisdictions.

In some embodiments, the ADATM transceiver unit may be configured to connect to the server automatically, upon power up of the platform, to receive all updates.

According to some embodiments, the ADATM transceiver unit may connect to the server via any of several channels, such as, for example, over an internet connection, using RF or using a mesh network or any combination.

In some embodiments, the server may issue each platform a takeoff clearance after successful completion of automatic registration and automatic download of all updates.

Obstacle information may relate to high buildings, antennas, peaks, electricity grid wires, cliffs, ground and other physical man-made or natural obstacles that may be present in a specific fly-zone. Server 128 may include, inter-alia, a machine learning 130 modality.

For example, ADATM transceiver unit 100 may include transceiver 108 for transmitting and receiving communications (e.g., RF signals). Again, in order to increase the reliability it is useful to include a plurality of transceivers in the ADATM transceiver unit, operating independently, so that if one transceiver fails, at least one other transceiver is capable of backing it up. Thus ADATM transceiver unit 100 may also include cellular communication module 110 (in the example of FIG. 1, there are two cellular communication modules, for communicating via two different cellular network service providers). The transceivers of the ADATM transceiver units are typically each designed to transmit their own location transmissions and receive location transmission from other ADATM transceiver units. According to some embodiments of the present invention there is no need for responding communications, as each ADATM transceiver unit only transmits its own location transmission and receives location transmissions from other ADATM transceiver units.

ADATM transceiver unit 100 may further include a recorder 112 for recording data that may be referred to at a later time. The recorded data may include, for example, all or some of the communications transmitted and received by that ADATM transceiver unit, processed data (data processed by the on-board ADATM transceiver unit 100 or by other ADATM transceiver units (on other platforms), and other data. The recorded data may be communicated to the remote server 128, at given times, for example, at the end of a flight.

The ADATM transceiver unit 100 may be powered by the power source providing power to other systems on-board the platform, A backup battery 114 may be provided to ensure that the ADATM transceiver unit 100 is operational at all times.

Storage device/Memory 115 is provided for storing software program or programs and data.

The ADATM transceiver is configured to transmit via the transceiver unit a location transmission that may be received by other ADATM transceiver units on other platforms located in a nearby flight zone. "Nearby" means that the other platforms are capable of receiving the communications transmitted from that ADATM transceiver unit and transmit communications that would be received by that ADATM transceiver unit.

According to some embodiments of the present invention, the ADATM transceiver unit 100 transmits a location transmission 120 that includes identity information (ID) of the transmitting platform, and its current location.

In some embodiments the location transmission may be continuous. In some embodiments the transmission may be intermittent. The intermittent transmission may be performed periodically, e.g., separated by fixed intervals of time. In some embodiments the length of the separating intervals of time may vary. For example, when the platform on board which the ADATM transceiver unit is located is relatively far from other platforms, the separating intervals of time may be longer (e.g., a fixed interval of time selected from the range of 1-5 seconds) than the separating intervals of time when the other platforms are closer (e.g., a time interval selected from the range of 0 to 1 second, and in some cases a range of 0.25 to 0.5 seconds). In some embodiments the separating intervals may vary with respect to a rate of change of the speed vector of the platform (e.g., the rate of change of the speed and/or heading of the platform). For example, the smaller the rate change the larger the intervals.

Current location information is good enough for determining the speed and heading of the platform if the current location is reported regularly, continuously or intermittently (but at a frequency high enough to allow calculating temporal speed and heading). In other embodiments of the invention, the communication may include additional information (e.g., altitude, heading, speed, etc.).

The ID of the platform is typically a unique identification data (e.g., a string of numbers and/or characters) that is uniquely assigned to a particular aircraft. The ID allows distinct identification but also reveals the type of that aircraft (in fact type, maker and even year of manufacture). Knowing the ID of a particular aircraft reveals its unique characteristics, including, for example, whether it is a manned or unmanned aircraft, its flight limitations (altitude, speed, maneuverablity), the blind areas around the platform that a pilot cannot see from the cockpit (which in the case of an unmanned aircraft include all periphery of the aircraft, as the platform is remotely controlled), etc. In some embodiments of the present invention the ID is assigned to each platform by an ADATM remote server. In other embodiments of the present invention the ID is preassigned by other assigning entity. In some embodiments of the present invention, platform ID may include several fields, such as for example: type of platform (e.g., piloted helicopter, piloted fixed wing aircraft, unmanned helicopter/quadrocopter, unmanned fixed wing aircraft, nature (passive/active), type of the general or current mission of the platform (e.g., police, medical evacuation, fire-fighting, passenger transportation, and other specific missions)

The ADATM transceiver unit 100 is also configured receives similar location transmissions 122 from other ADATM transceiver units on-board other platforms.

The ADATM transceiver unit 100 may also be configured to upload software application or software updates, e.g., updates to the operating system, data and data updates such as in the form of databases and files, for example, look-up tables, regulatory information (e.g., databases in which VFR, IFR, and other regulatory data is saved, etc.). The uploads may be transmitted or pulled from a remote server, e.g., an internet server via a communication link using cellular communication module 110. Similarly, data (e.g., trajectory data, event data, etc.) may be forwarded or pulled from the ADATM transceiver unit 100 via that communication link.

The ADATM transceiver unit 100 is configured, using processor 102 to execute one or a plurality of programs which are designed to use the data from the transmitted and received location transmissions and to calculate anticipated trajectories of the platform on which the ADATM transceiver unit 100 is positioned (hereinafter—the "own platform") as well as the other platforms, in order to determine whether the own platform may stay on its present course or is bound to collide with another platform. In case of the latter, the ADATM transceiver unit of the own platform is configured to issue a warning and instructions take an evading action. The evading action may be directed to avoid various events, such as, for example, collision, exit from or entry to flight limited zone (e.g., about to get below or above a permitted flight altitude range, entry into a no-fly zone, or a flight restricted zone).

According to some embodiments of the invention, the ADATM transceiver unit 100 is configured to present the warning and the instructions for the evading action to the pilot. For example, the warning and the instructions may be in the form of audio signals 134, such as a siren, alarm sound and spoken instructions or a combination thereof, or in the form of a visual signal, displayed on the heads-up display 132 of the pilot (e.g., on the screen of his helmet). In the case of an unmanned platform, the remote pilot who remotely controls the platform is presented with the warning and an evading action instruction 136 on a display of the pilot's computer or hand-held device.

According to some embodiments of the invention, the ADATM transceiver unit 100 is configured to override the flight controls of the platform and perform autonomous steering 138 to cause the flight controls of the platform to perform the evading action. This is likely to be the case when the "own platform" is an unmanned platform.

The evading action instruction should conform to the appropriate rules and regulations that ought to be followed at the time (e.g., VFR).

Figure 2:
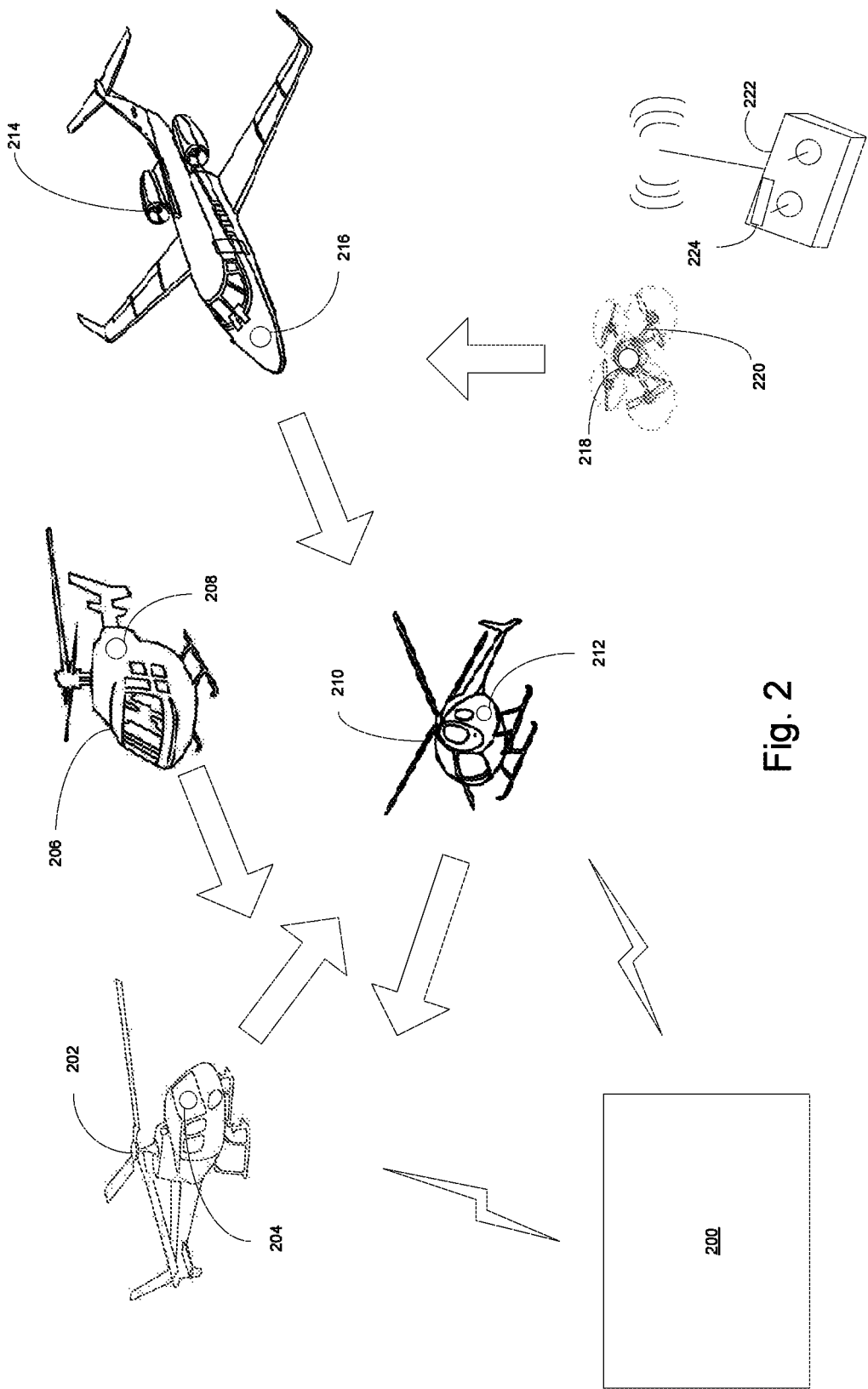
FIG. 2 illustrates a flight zone in which a plurality of platforms concurrently exist, each of which including an on-board ADATM transceiver unit, according to some embodiments of the present invention.

FIG. 2 illustrates a flight zone in which a plurality of platforms concurrently exist, each of which including an on-board ADATM transceiver unit, according to some embodiments of the present invention.

In the example depicted in FIG. 2 there are several aircraft flying within the same flight zone: three helicopters, 202, 206 and 210, each with a ADATM transceiver unit 204, 206 and 212, respectively, on-board, a fixed wing aircraft 214, with an on-board ADATM transceiver unit 216, and a remote-controlled drone 220 with an on-board ADATM transceiver unit 218, controlled by a remote operator using remote-control 222 (with audio/video output device 224). Each of the platforms is heading in the direction marked by the arrow in front of that platform. The size of the flight zone and or the number of aircraft allowed in may be predetermined by a flight authority. This and other information may be provided to the ADATM transceiver units from server 200 via a communication link (see, for example FIG. 1 and related explanation hereinabove).

According to some embodiments of the present invention, the ADATM transceiver unit on each platform is designed to assess a risk of collision between the own platform and other platform equipped with ADATM transceiver unit, and given certain conditions are met, provide an evading action instruction to the pilot of the own platform. In the case of a remote controlled unmanned platform, the evading action instruction may be presented to the remote operator of that platform, and in some embodiments of the present invention, the ADATM transceiver unit may override the flight controls of the own platform and cause the platform to perform the evading action.

First, the determination of a risk of collision is hereinafter explained.

Possible visual contact (PVC) is defined, for the context of the present invention with respect to a given platform: when a first platform is in the field of view (FOV) of the pilot of the second platform it is determined that the second platform is in a PVC condition. The FOV may vary from one type of platform to another, and is known to the ADATM transceiver units (e.g., provided in a database listing all types of aircraft and their inherent FOV, which is typical for each type of aircraft. The FOV may be determined by three maximal angles defining the FOV of the pilot: the maximal angle above the plane extending straight ahead of the eyes of the pilot in which the pilot may still see outside the cockpit, the angle below that plane and the maximal side angle in which the pilot may still see outside the cockpit. The FOV is determined for each type of platform, and is considered, in some cases, to be the same for any pilot onboard that platform, considered to be the same for any visibility conditions. In other cases the PVC may be affected by visibility conditions. Other parameters that may be considered to affect PVC may include, for example, human engineering considerations, human limitations, preset limitations, and more. FOV may also be defined by different parameters.

Figure 3:
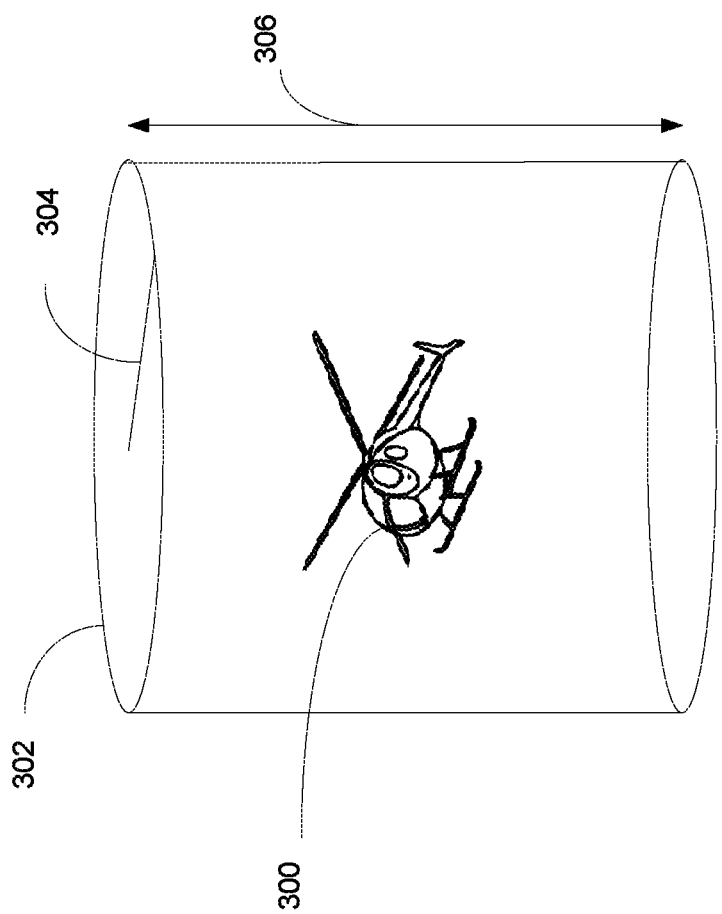
FIG. 3 illustrates a safety cylinder (SC) defining a safety volume around the platform, according to some embodiments of the present invention.

FIG. 3 illustrates a safety cylinder (SC) 302 defining a safety volume around the platform 300, according to some embodiments of the present invention, which is not to be penetrated by another platform's SC. The two platforms are considered, each, to be within a safety cylinder (SC)—a vertical cylinder in which the platform is located at the center. According to some embodiments of the invention, the SC dimensions (radius and height) are dynamic and change in response to or under certain conditions, such as, for example:

When the two platforms are closer, the SC dimensions are greater than when they are further apart;

The SC dimensions of the two platforms, when flying in a mutually intentional flight pattern, are smaller than the dimensions of the SC of the two platforms when flying a mutually unintentional flight pattern, for a given distance;

When the rate of closure is above a predetermined threshold the dimensions of the SC of the two platforms increase;

When the PVC is negative for both platforms the dimensions of the SC increase.

The SC radius 304 and height 306 may be determined by an algorithm executed on the ADATM transceiver unit (for each platform).

Figure 4A:
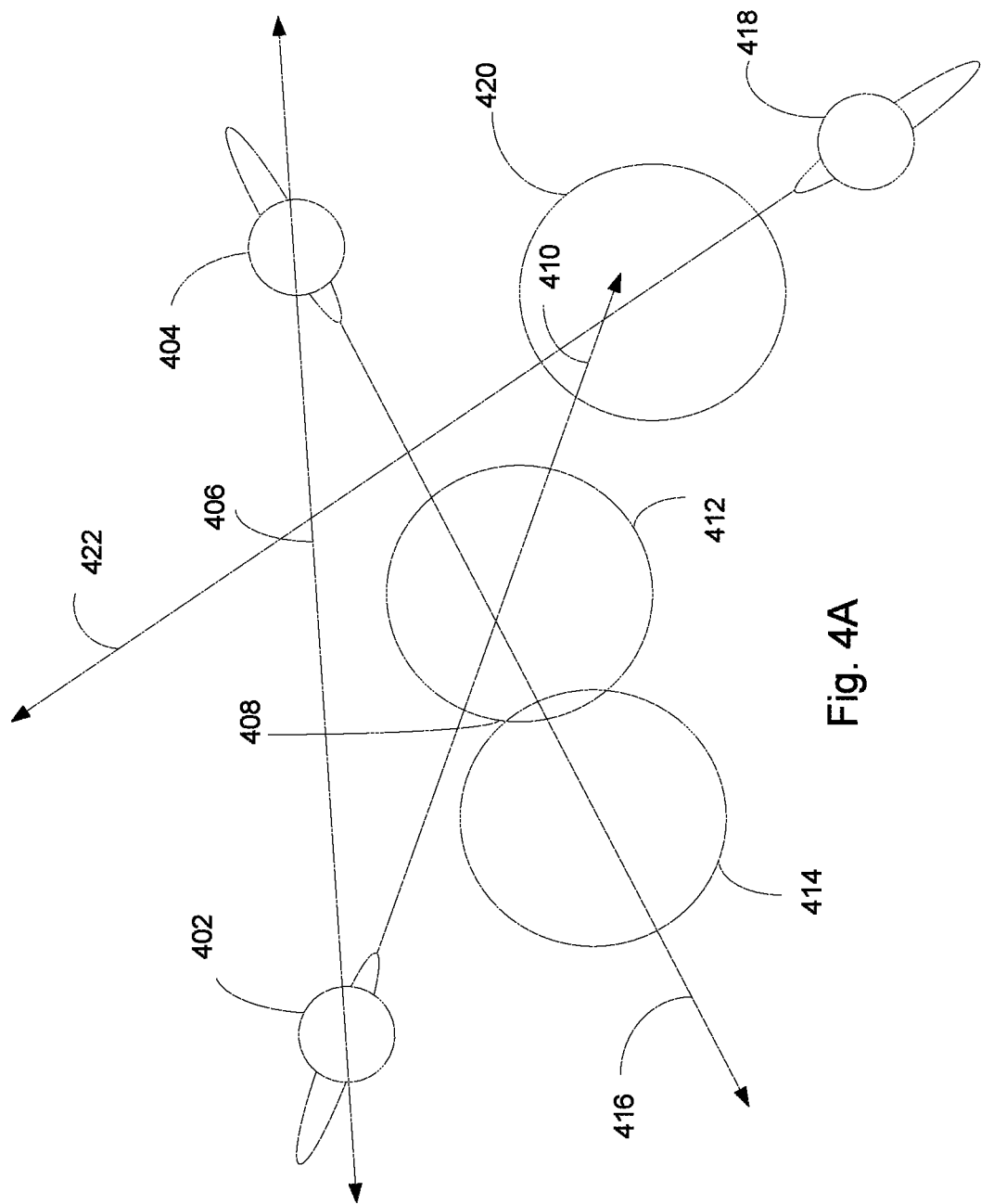
FIG. 4A illustrates a potential collision scenario of two platforms flying in a collision path, and application of an algorithm to assess the risk of collision and to generate an evading action instruction, according to some embodiments of the invention.

FIG. 4A illustrates a potential collision scenario of two platforms flying in a collision path, and application of an algorithm to assess the risk of collision and to generate an evading action instruction, according to some embodiments of the invention.

Two platforms 402 and 404 each fly along a flight path 410 and 416 respectively. line 406 represents the heading of each of the platforms to the other platform. By knowing its own platform's location and from the location data received from the other platform via the location transmission from that platform's ADATM transceiver unit, the ADATM transceiver unit of the own platform can calculate the trajectories of both platforms, and determine the time to collision (TTC), which is the time when the two safety cylinders (SCs—412 and 414) come into contact. The actual point of collision 408, which is the point where the two cylinders collide, is also depicted. A third platform 418 is flying along a flight path 422 that does not pose any risk of collision, as the determined trajectory of that platform reveals that its SC 420 is not going to collide with any of the other SCs (412, 414) if the current flight conditions remain unchanged.

The ADATM transceiver unit may issue an evading action instruction to the pilot of its own platform.

Figure 4B:
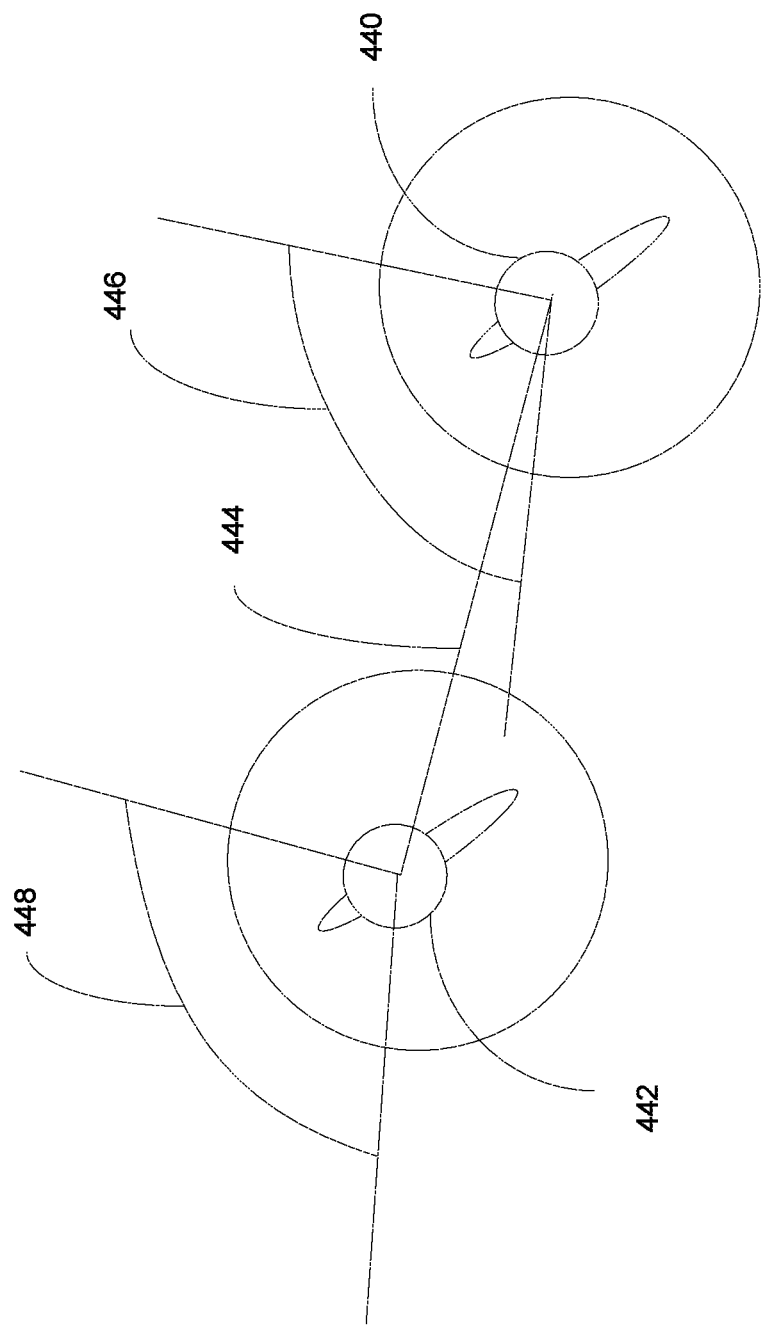
FIG. 4B illustrates determination of a formation flight (FF) according to some embodiments of the present invention.

FIG. 4B illustrates determination of a formation flight (FF) according to some embodiments of the present invention.

According to some embodiments of the present invention, the ADATM transceiver unit may determine whether several platforms (including or excluding its own platform) are flying in a flight formation pattern. Determining formation flight (FF) pattern may be based FF indications, and relates to a pair of platforms 440, 442, in flight, each platform having a FOV, 446 and 448, respectively.

If there are more than two platforms flying in FF, than each of the ADATM transceiver units of these platforms would relate to pairs in that formation (the own platform and one other platform of the other platforms). According to some embodiments of the present invention, FF indications include: 1) the distance 444 between the platforms 440, 442, of the pair is not greater than a predetermined distance (in many cases the typical distance between two aircraft flying in formation ranges between 30-500 meters), and 2) at least one platform of the pair has positive PVC (meaning it has visual contact with the other platform). When the ADATM transceiver unit determines that the two indications exist concurrently, over a period of time (e.g., more than a threshold minimal period of time) it considers this flight to be a formation flight.

In the example shown in this figure, platform 440 has positive PVC with respect to the other platform 442. In case of unmanned platforms PVC may be defined in terms of sensing each other or otherwise being aware of the existence of each other at their current positions, rather than actually having visual contact (which is not possible as there is no onboard pilot involved). The determination of FF is based on the concurrent existence of the two indications).

When flying in FF, the ADATM transceiver unit will refrain from issuing an alert regarding the short distance separating the two platforms, as long as the two platforms remain in a mutually intentional flight pattern. The SC of the two platforms is adjusted (decreased) to the situation to avoid unnecessary alert and consequent undesired evading action.

According to some embodiments of the present invention, the ADATM transceiver unit may relate to its own platform's and the other platform/s FOV in determining that they are flying in formation. For example, the ADATM transceiver unit may determine the PVC condition between its own platform and another platform. The PVC condition between a first platform and a second platform may be positive for the first platform, if that platform is capable of viewing the second platform, or negative, if it cannot see the second platform. Similarly, the PVC condition between the second platform and the first platform may be positive for the second platform, if that platform is capable of viewing the first platform, or negative if it cannot see it. The PVC condition of one platform with respect to the other is independent from the PVC condition of the other platform with respect to the first one. Thus, for example, if the PVC condition for both platforms is negative (e.g., for a predetermined period of time), that is they cannot see each other, it may be determined that they are not flying in formation.

Figure 4C:
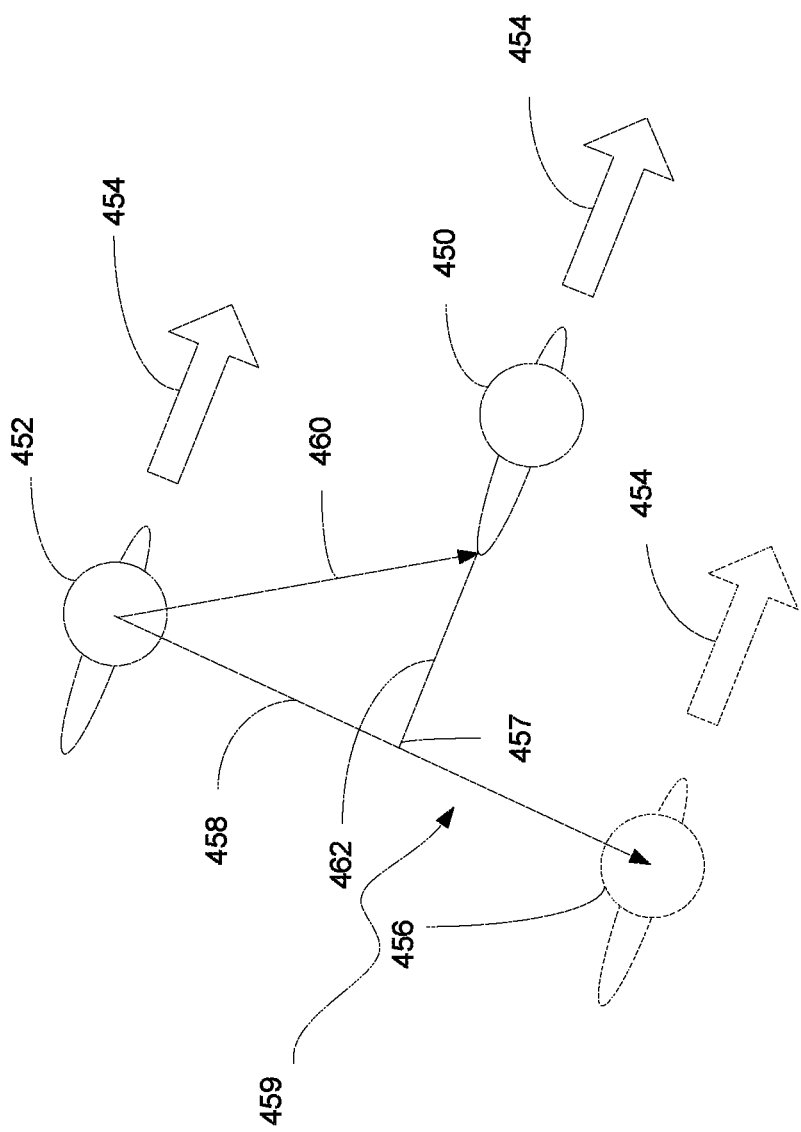
FIG. 4C illustrates determination of a cross over flight pattern, according to some embodiments of the present invention.

FIG. 4C illustrates determination of a cross over flight pattern, according to some embodiments of the present invention. Two platforms 450, 452, are flying in formation. Platform 450 is leading with platform 452 flying behind and to the left of platform 450. The ADATM transceiver units of both platforms is able to recognize this flight pattern as FF (in the manner explained hereinabove) and allow the two platforms to fly close by, separated by a distance marked by line 460 and heading in the direction marked by arrows 454. Distance 460 is made up of two orthogonal components: parallel component 462 (parallel to heading 454), and perpendicular component 458 (perpendicular to heading 454). The pilot of platform 452 may wish to cross over to a position behind and to the right of platform 450, and starts crossing along line 459, substantially perpendicular to the heading 454 of the two platforms. As platform 452 sweeps across line 459, the parallel distance component first decreases, as platform 452 draws nearer the closest point 457 to platform 450 on line 459, and then increases as platform 452 moves further along line 459 until it reaches its new desired position 456.

Had the two platforms been flying in an mutually unintentional flight pattern, the ADATM transceiver unit of both platforms would have immediately detected increased rate of closure between the two platforms, or other parameters such as negative PVC for both or significant heading change, and would have acted by issuing an alert and generating an evading action instruction. However, the ADATM transceiver units of both platforms are able to determine that the two platforms are flying in formation. Furthermore, when the cross over maneuver is performed, the ADATM transceiver units are configured to detect and determine that while the parallel component of the distance between the two platforms is decreasing the perpendicular component remains substantially unchanged. Under these conditions, the ADATM transceiver units of the platforms will refrain from issuing an alert and allow the rear platform 452 to complete its cross-over maneuver.

The ADATM transceiver unit may be configured to identify and respond to two or more different alert levels. For example:

a) a first alert level may be in the case the own platform and one or more other platforms exist within a flight zone of predetermined size, where no emergency situation is identified. In some embodiments of the invention, this alert level may be one of the indications for ruling out FF—the pilot of the own platform is required to remain at attention, but is not required to immediately act;

b) a second alert level may indicate a situation where the own platform and at least one other platform are flying in formation or are facing a risk of collision—the pilot is required to pay close attention and be ready to perform an evading action as soon as it is required;

c) a third alert level may indicate an emergency situation (e g imminent risk of collision), and requires the pilot of the own platform to perform immediate evading action.

When on the ground, e.g., stationary or traveling over the ground (e.g., taxiing), or when hovering over the ground at a low height (below a predetermined altitude), the ADATM transceiver unit is configured to switch to ground mode. This may be determined, for example, by the GPS height data, electronic height measurement, squat switch, rate of closure between the own platform and another platform, and vertical and horizontal speeds. This means that the alert level is modified to allow for normal flight procedures, for example: starting (beginning to fly) or ending (ending a flight) procedures to take place. The radius and height of the SC of a platform in ground mode is set to be smaller than when in flight. In some embodiments of the invention, the ADATM transceiver unit is still ready to act when a risk is detected and determined. For example, when another platform is in a collision course towards the own platform, the ADATM transceiver unit would alert the pilot and issue an evading action instruction (such as, for example, taxi forward).

The ADATM transceiver unit may be configured to identify FF, for example, based on the above one or more FF indications.

Similarly, the ADATM transceiver unit may identify platforms breaking away from FF and ceasing to fly in formation, for example, by determining that the platforms that have previously been in FF are no longer flying in formation, for example by determining that the distance between them is greater than a predetermined maximal FF distance, or by determining that the PVC for both platforms is negative (or determining both).

In some embodiments of the present invention, the ADATM transceiver units onboard the platforms participating in an ADATM environment, may be used for density control, in which the number of platforms in a given area is monitored and controlled Density control may include, for example:

A) limiting the number of platforms within a specific fly-zone;

B) limiting the number of platforms within a sector of a fly-zone;

C) prioritizing specific types of platforms (e.g., assigning higher priority to a medical evacuation platform over traffic reporting platform, etc.);

D) identifying a situation in which the own platform is about to enter a restricted flight zone, in which the maximal number of platforms has been reached, and issuing an evading action instruction, to prevent violation of the restricted fly-zone.

When generating an evading action instruction, the ADATM transceiver unit may take into account various parameters, such as, for example, a response time (the time it takes for a pilot to react upon receiving an evading action instruction), estimated time to start a maneuver (e.g. a turn) and rate of turn.

According to some embodiments of the present invention, the evading action instruction may be generated based on rules, such as the following:

Vertical Evasion:

A) the higher (higher altitude) platform is directed to ascend;

B) the lower platform is directed to descend;

C) in an undefined situation, master-slave approach prevails. According to this approach, one of the two platforms is designated as a "master" platform, while the other platform is designated "slave". For example, the platform with the higher ID number may be designated as "master". In other embodiments this designation may be predetermined or otherwise determined The master will have a first priority in determining how to react, and only upon reaction (while keeping transmitting its location transmissions) the other "slave" platform, upon determining how the "master" platform is behaving, will react to the "master" platform maneuver (e.g., if the "master" platform ascends it will descend, and vice versa).

Horizontal Evasion:

Several flight modes may be defined: head-on, orthogonal mode - - - , hover mode, cross mode, and multiple platform mode. Each ADATM transceiver unit determines for its own platform how to act in each of this modes. In some embodiments of the present invention, the evading action is determined based on the current flight mode. For example:

A) Head-on mode: each platform turns in a predetermined direction (e.g., both turn to their own right, or both turn to their left);

B) Orthogonal-mode is when the own platform is flying in a direction orthogonal to the flight direction of another platform, is heading towards the other platform, the risk of a mid-air collision is high and there is enough time (calculated from the distance, speed, amount of turn, rate of turn), the evading maneuver of the own platform would be to pass behind the other platform, while the other platform will react according to the general mode (see hereinafter);

C) Hover-mode (when one of the two platforms is hovering in position): assume to 90 degrees away from the heading towards the hovering platform, or, if the other platform is hovering, 180 degrees from the direction of the other platform (if the own platform is the one that is hovering), and accelerate;

D) General mode for all other situations not included in the other modes: if the vertical projection (looking from atop) of the straight line connecting the own platform to the point of collision of the SCs of the two platforms is located on the left to the line connecting between these platforms— turn left; and if the vertical projection (looking from atop) of the straight line connecting the own platform to the point of collision of the SCs of the two platforms is located on the right to the line connecting between these platforms—turn right;

E) Multiple platform mode: In case an ADATM transceiver unit determines an "emergency" situation (e.g., imminent risk of collision) and generates an evading action instruction for the own platform, it transmits an "emergency" alert in its own location transmission and the new heading and altitude it is about to take to evade the risk. Other platforms in the vicinity of that platform verify whether the new course of the platform at risk is posing a threat, e.g., if platforms in vicinity continue their speed and heading, will they be in conflict with the platform at risk after executing their evading actions. If the evading actions of the two platforms pose a risk to third party platforms, the ADATM transceiver unit of any of these third party platforms would issue an alert to the pilots and generate evading action instructions in response to the evading action maneuver the two involved platforms are about to perform.

Calculations and determinations of states, situations, conditions, mode etc., according to the present invention, are based on the data each ADATM transceiver receives from the location transmissions of the other platforms, and on its own location data (ID and location and any other information if available).

Figure 5:
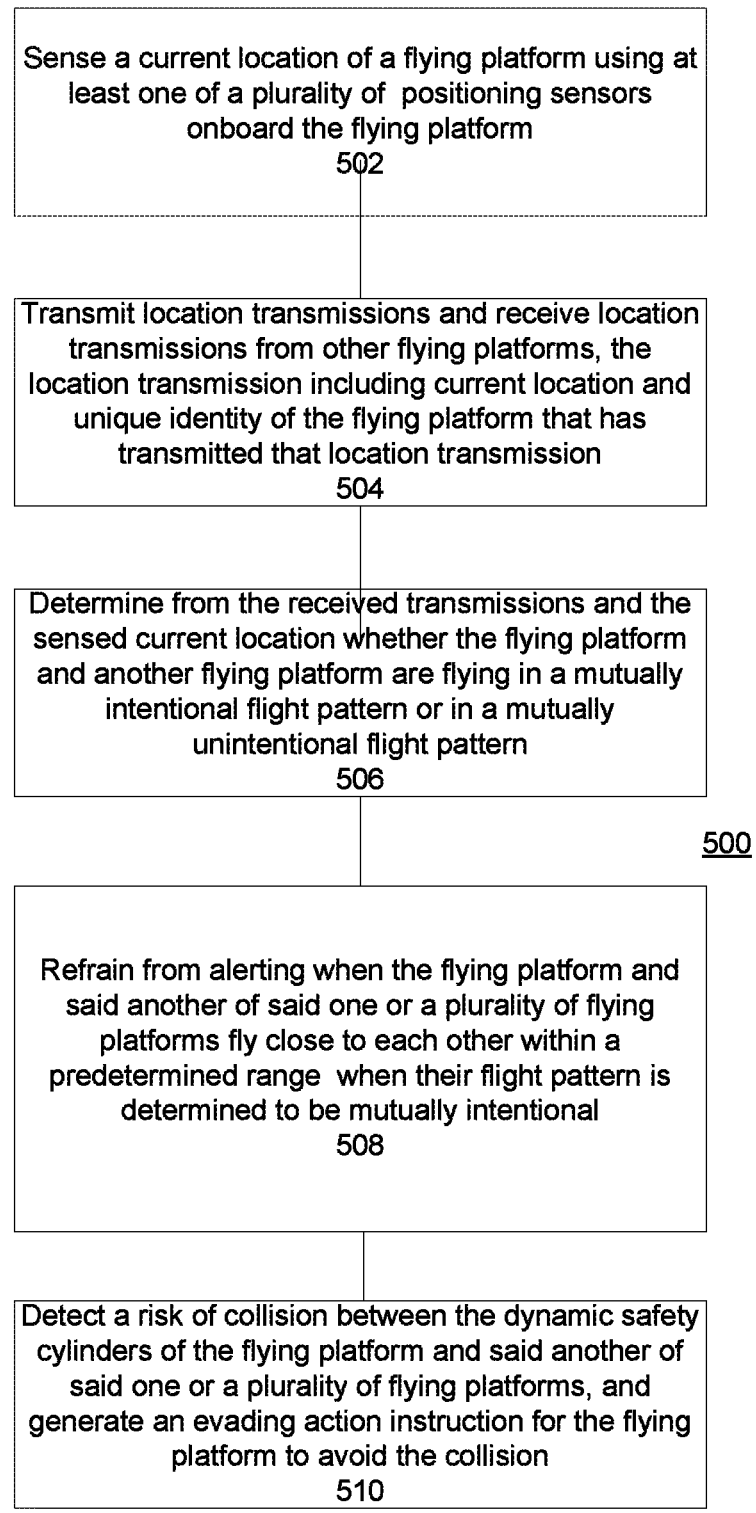
FIG. 5 illustrates a method of autonomous dynamic air traffic management, according to some embodiments of the present invention

FIG. 5 illustrates a method of autonomous dynamic air traffic management, according to some embodiments of the present invention. Method 500 may include: sensing 502 a current location of a flying platform using at least one of a plurality of positioning sensors onboard said flying platform.

Method 500 may further include transmitting 504 location transmissions and receiving location transmissions from one or a plurality of other flying platforms, the location transmission including current location and unique identity of the flying platform that has transmitted that location transmission. Method 500 may also include determining 506 from the received location transmissions and the sensed current location whether the flying platform and another of said one or a plurality of flying platforms are flying in a mutually intentional flight pattern or in a mutually unintentional flight pattern, based on one or more indications from the received location transmissions and the sensed current location. Method 500 may further include, refraining 508 from alerting when the flying platform and said another of said one or a plurality of flying platforms fly close to each other within a predetermined range when their flight pattern is determined to be mutually intentional Method 500 may further include detecting 510 a risk of collision between the dynamic safety cylinders of the flying platform and said another of said one or a plurality of flying platforms, and generating an evading action instruction for the flying platform to avoid the collision.

determining, using the processor, a flight pattern of the flying platform and a flight pattern of one or more of the other flying platforms; detecting a risk of collision between the flying platform and one or more of the other flying platforms; and generating an evading action instruction for the flying platform.

ADATM transceiver unit may include an input interface for receiving data and instructions from a user, such as, for example, one or a plurality of keyboards, pointing devices, touch sensitive surfaces (e.g. touch sensitive screens), etc. for allowing a user to input commands and data. The processor may be linked with a memory on which a program implementing a method according to some embodiments of the present invention and corresponding data may be loaded and run from and data may be saved, and a storage device, which includes a non-transitory computer readable medium (or mediums) such as, for example, one or a plurality of hard disks, flash memory devices, etc. on which a program implementing a method according to some embodiments of the present invention and corresponding data may be stored. The unit may further include an output device (e.g., display device such as CRT, LCD, LED etc.) on which one or a plurality user interfaces associated with a program implementing a method according to some embodiments and corresponding data may be presented.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with examples. In some examples, the instructions stores on the computer readable medium may be in the form of an installed application and in the form of an installation package.

Such instructions may be, for example, loaded by one or more processors and get executed.

For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

Some embodiments are described hereinabove with reference to flowcharts and/or block diagrams depicting methods, systems and computer program products according to various embodiments.

Features of various embodiments discussed herein may be used with other embodiments discussed herein. The foregoing description of the embodiments has been presented for the purposes of illustration and description. It is not intended to be exhaustive or limiting to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes that fall within the true spirit of the present invention.

The invention claimed is:

1. An autonomous dynamic air traffic management (ADATM) transceiver unit for mounting onboard a flying platform, the unit comprising:
at least one of a plurality of positioning sensors to sense a current location of the flying platform;
at least one of a plurality of transceivers to transmit location transmissions and to receive location transmissions from one or a plurality of other ADATM transceiver units each mounted onboard one or a plurality of other flying platforms, the location transmission including current location and unique identifier of the flying platform that has transmitted that location transmission; and
a processor configured to:
determine from the received location transmissions and the sensed current location whether the flying platform and another of said one or a plurality of flying platforms are flying in a mutually intentional flight pattern or in an mutually unintentional flight pattern, based on one or more indications from the received location transmissions and the sensed current location;
refrain from alerting when the flying platform and said another of said one or a plurality of flying platforms fly close to each other within a predetermined range when their flight pattern is determined to be mutually intentional;

detect a risk of collision between the flying platform and said another of said one or a plurality of flying platforms; and generate an evading action instruction for the flying platform to avoid the collision, wherein the processor is configured, based on the determined flight pattern, to consider a dynamic safety cylinder around each of the flying platform and said another of said one or a plurality of flying platforms, decreasing the dimensions of the dynamic safety cylinders when the flight pattern is determined to be mutually intentional, and increasing the dimensions of the dynamic safety cylinders when the flight pattern is determined to be mutually unintentional.

2. The unit of claim 1, wherein the predetermined range is 30 to 500 meters.

3. The unit of claim 1, wherein the processor is configured to detect the risk of collision based on calculating a risk of collision between the dynamic safety cylinders of the flying platform and said another of said one or a plurality of flying platforms.

4. The unit of claim 1, further configured to perform density control within a dynamically ad-hoc determined restricted fly-zone.

5. The unit of claim 1,
wherein the processor is configured to generate the evading action instruction based on one or more of the following rules: the platform which is higher is instructed to ascend and the other platform to descend, in an undefined situation a master-slave approach is used, where one of the platforms is designated as a master, and another of said one of more platforms is designated as a slave, and
wherein the slave platform is configured to react to a maneuver performed by the master platform.

6. The unit of claim 1, further comprising an output device to output the evasion action instruction for presenting the evading action instruction to a pilot of the flying platform.

7. The unit of claim 1,
wherein the mutually intentional flight pattern is cross over, and
wherein processor is configured to determine the cross over, when a parallel component of a distance between the flying platform and said another of said one or a plurality of flying platforms remains substantially unchanged while a perpendicular component of the distance is changing.

8. The unit of claim 1, wherein the processor is configured to cause overriding of flight controls of the flying platform and to cause the flying platform to perform the evading action instruction.

9. The unit of claim 1, wherein the mutually intentional flight pattern is selected from the group of flight patterns consisting of flight formation, cross-over, fly-by, and orthogonal flight.

10. The unit of claim 1,
wherein the mutually intentional flight pattern is formation flight,
wherein the processor is configured to determine the formation flight when a distance between the flying platform and said another of said one or a plurality of flying platforms is not greater than a predetermined distance, and wherein at least one of the flying platform and said another of said one or a plurality of flying platforms has positive possible visual contact (PVC) with respect to the other of said flying platform and said another of said one or a plurality of flying platforms, over a predetermined period of time.

11. The unit of claim 1, wherein the processor is further configured to detect a flight mode relating to the flying platform and one of the other flying platforms, and wherein the evading action instruction is based on the detected flight mode.

12. The unit of claim 11, wherein the flight mode is selected from the group of modes consisting of: head-on mode, orthogonal-mode, hover-mode, general mode, and multiple platform mode.

13. A method for autonomous dynamic air traffic management (ADATM), the method comprising:

sensing a current location of a flying platform using at least one of a plurality of positioning sensors onboard said flying platform;

transmitting location transmissions and receiving location transmissions from one or a plurality of other flying platforms, the location transmission including current location and unique identity of the flying platform that has transmitted that location transmission;

determining from the received location transmissions and the sensed current location whether the flying platform and another of said one or a plurality of flying platforms are flying in a mutually intentional flight pattern or in an mutually unintentional flight pattern, based on one or more indications from the received location transmissions and the sensed current location;

based on the determined flight pattern, considering a dynamic safety cylinder around each of the flying platform and said another of said one or a plurality of flying platforms, decreasing the dimensions of the dynamic safety cylinders when the flight pattern is determined to be mutually intentional, and increasing the dimensions of the dynamic safety cylinders when the flight pattern is determined to be mutually unintentional;

refraining from alerting when the flying platform and said another of said one or a plurality of flying platforms fly close to each other within a predetermined range when their flight pattern is determined to be mutually intentional;

detecting a risk of collision between the flying platform and said another of said one or a plurality of flying platforms; and generating an evading action instruction for the flying platform to avoid the collision.

14. The method of claim 13, wherein detecting the risk of collision is based on calculating a risk of collision between the dynamic safety cylinders of the flying platform and said another of said one or a plurality of flying platforms.

15. The method of claim 13, further comprising obtaining updates from a remote server and providing recorded data to the remote server.

16. The method of claim 13, further comprising outputting the evasion action instruction on an output device for presenting the evading action instruction to a pilot of the flying platform.

17. The method of claim 13, further comprising overriding of flight controls of the flying platform and to causing the flying platform to perform the evading action instruction.

18. The method of claim 13, wherein the mutually intentional flight pattern is selected from the group of flight patterns consisting of flight formation, cross-over, fly-by, and orthogonal flight.

* * * * *